Dec. 23, 1930.  F. GRIFFITH  1,786,343
UNIVERSAL DRAG CONVEYER
Filed Feb. 7, 1930  2 Sheets-Sheet 1
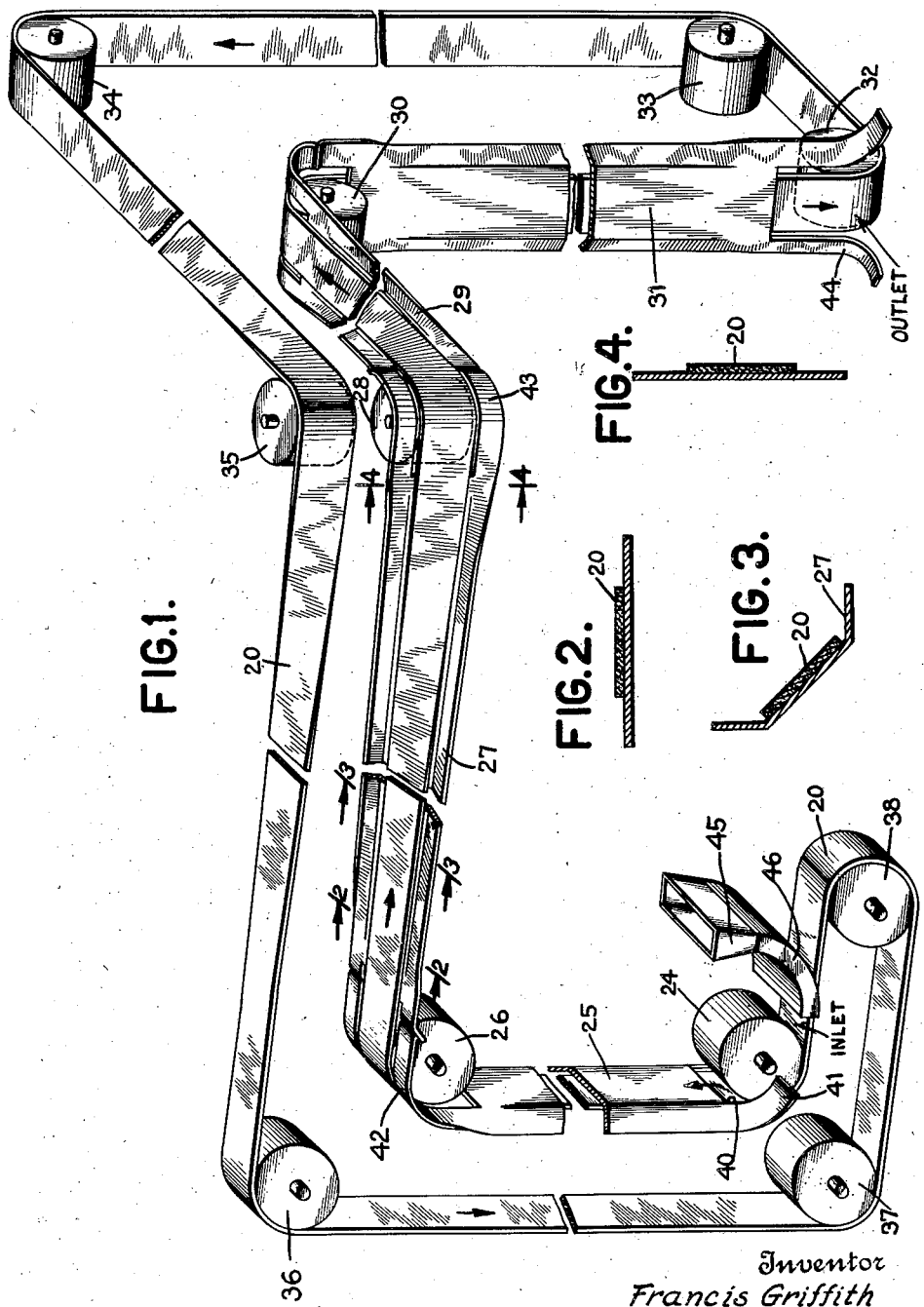
Inventor
Francis Griffith
By his Attorney
Eugene C. Brown Dec. 23, 1930.  F. GRIFFITH  1,786,343
UNIVERSAL DRAG CONVEYER
Filed Feb. 7, 1930  2 Sheets-Sheet 2

Inventor
Francis Griffith
By his Attorney
Eugene C. Brown

Patented Dec. 23, 1930

1,786,343

UNITED STATES PATENT OFFICE

FRANCIS GRIFFITH, OF PASSAIC, NEW JERSEY, ASSIGNOR TO THE WESTERN UNION TELEGRAPH COMPANY, OF NEW YORK, N. Y., A CORPORATION OF NEW YORK

UNIVERSAL DRAG CONVEYER

Application filed February 7, 1930. Serial No. 426,709.

This invention relates to a drag conveyer particularly adapted for transporting sheet material such as letters, telegrams, and the like.

In a co-pending application of F. E. d'Humy et al., Serial No. 422,126, filed January 20, 1930, and entitled "Drag conveyer", a conveyer system is described which is particularly designed for transporting small flat articles, such as telegram blanks, from one portion of a building or office to another. Briefly, this system consists of a single endless belt, of a width considerably less than the width of the articles to be conveyed, the belt being dragged along its main or operating run in a flat trough having outwardly flaring or diverging side walls. The articles are conveyed between the belt and the trough in frictional contact with the belt, with the edges of the articles extending over, at least a portion of the flaring sides of the trough.

The flaring sides of the trough prevent the sheet articles from working out from under the belt, at either side thereof and they distort the material from a flat plane into a concave form, so as to increase the friction or grip between the belt and the articles. The trough also serves as a guide and as a support for the belt.

Whenever it is desired to change the direction of travel of the conveyer, the flaring sides of the trough are bent into the plane of the base of the trough slightly in advance of the bend and the base of the trough is cut away at the bend to enable the belt to engage with a direction changing pulley or roller.

The conveyer of said aforementioned application may comprise any number of different parts or sections extending in any desired vertical, horizontal, or inclined direction, as long as all transverse elements of the belt are parallel, or otherwise stated, as long as the corresponding longitudinal elements of every section, such as one edge of the belt, are in substantially the same vertical plane, and as far as I am aware, this restriction of the conveyer to a two dimensional field is true of all conveyers heretofore proposed, employing but a single belt in which the articles are conveyed by frictional contact with the belt.

One of the objects of the present invention is, therefore, to produce a conveyer employing but a single belt, such as a drag conveyer, in which the direction of travel of the various parts thereof may extend into three dimensional space.

Another object is to provide a drag conveyer in which the channel and belt may be twisted from one plane to another, as from a horizontal to a vertical plane.

Other objects and advantages will appear from the following description, taken in connection with the drawings and the appended claims.

In order that full understanding of the invention may be had, reference will be made to the accompanying drawings in which:

Figure 1 is a perspective view of a conveyer system embodying the present invention;

Figure 2 is a sectional view taken on the line 2—2 of Figure 1;

Figure 3 is a sectional view taken on the line 3—3 of Figure 1;

Figure 4 is a sectional view taken on the line 4—4 of Figure 1;

Figure 6:
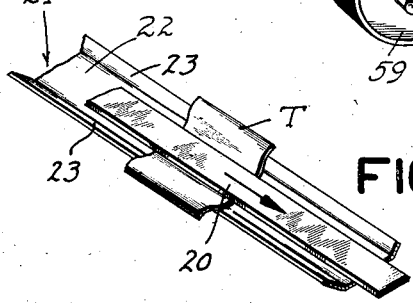
Figure 6 is a perspective view of a straight portion of the drag conveyer.

Referring first to Figure 6, it will be seen that the conveyer comprises a belt 20 travelling in a trough 21, having a base 22 and outwardly diverging side walls 23. The articles to be conveyed, which may be telegram blanks T, are disposed in the conveyer between the belt 20 and the base of the trough, the sides of the articles extending over the flaring of diverging side walls 23 so as to assume a concave shape. The trough forms a support and a guide for the belt and as stated before, the flaring sides 23 prevent the articles from working out from beneath the belt as they are carried along thereby.

The conveyer system shown in Figure 1 comprises the endless belt 20 passing continuously around the various rollers shown in the direction of the arrows. The inlet of the conveyers is adjacent the roller 24 at the point marked "Inlet", and the outlet of the conveyer is at the opposite end of the system at the point marked "Outlet". Between the inlet and outlet ends of the conveyer the belt travels in a series of stationary troughs, the path of the belt being traced from the roller 24, vertically upward in a trough section 25, thence around a roller 26 and horizontally in a trough section 27 to a roller 28, the trough section 27 being twisted through an angle of about 90 degrees, from a horizontal to a vertical plane, between the rollers 26 and 28, the belt following the twist of the trough. From the roller 28 the belt extends rearwardly in contact with a trough section 29 disposed at right angles to the trough section 27 and in the same general horizontal plane, the trough section 29 being twisted back from the vertical to a horizontal position. At the end of the trough section 29 the belt passes around a roller 30 and thence vertically downward to the outlet end of the conveyer in contact with a trough section 31. The return run of the belt continues around the rollers 33 to 38 back to the inlet portion of the conveyer. The return path of the belt may also be supported in trough sections if desired and when so supported, may serve to convey the articles in the reverse direction.

The ends of the troughs, adjacent the rollers, are shaped so as to facilitate the passage of the articles being conveyed on to the trough sections and around the direction changing rollers. Thus, for instance, the trough 25 has the base portion cut away adjacent its lower end, as at 40, and the depending side flanges 41 are bent, first into the general plane of the base and then curved along the ends of the roller 24 so as not to interfere with telegrams or other articles, introduced into the conveyer between the roller 24 and the belt, being carried around the roller and into the trough 25 beneath the belt.

At the upper end of the trough 25 the base is also cut away to permit the roller 26 to extend between the side flanges 42 into contact with the belt. The side flanges 42 adjacent the roller are flattened into the plane of the belt and are curved around the roller 26, terminating just above the ends of the side flanges of the trough section 27, which latter flanges are also flattened out into the plane of the belt. The articles may therefore be carried around the roller 26 without hindrance and on to the trough section 27.

The ends of the troughs are similarly shaped at the rollers 28 and 30. The vertical trough section 31 adjacent the roller 32 has the base of the trough cut away and the side flanges first bent into the plane of the belt and then curved rearwardly away from the roller to enable the telegrams or other articles to drop freely from between the belt and the trough.

A tray or other form of receptacle may be disposed beneath the lower end of the trough section 31 to catch the articles as they are discharged therefrom, or another conveyer may be arranged so as to receive the articles from the end of the trough 31, and continue the transportation thereof.

To facilitate the feeding of the articles into the conveyer, a chute 45 having a downwardly curved outlet portion 46, may be positioned adjacent the roller 24 to direct the articles on to the belt 20, in position to be engaged between the belt and the roller 24.

By forming a twist in the belt and trough, I am enabled to extend the conveyer in any desired direction in three dimensional space and thereby greatly increase the field of usefulness thereof. Due to the outwardly flaring sides of the trough, the articles are held beneath the belt along the portions of the conveyer in which the transverse elements of the belt are arranged vertically, or in an inclined position, as adjacent the roller 28, the length of the conveyer at the roller 28, in which the side flanges 43 are flattened out so as to be substantially continuous with the surface of the belt, being sufficiently short, so that the articles do not have an opportunity to work out from under the belt at this point.

It will be understood on long runs of the conveyer sections 27 and 29, that the belt and trough may be disposed horizontally over the major portion of the run, the twists being formed relatively close to the roller 28 at each side thereof.

Figure 5:
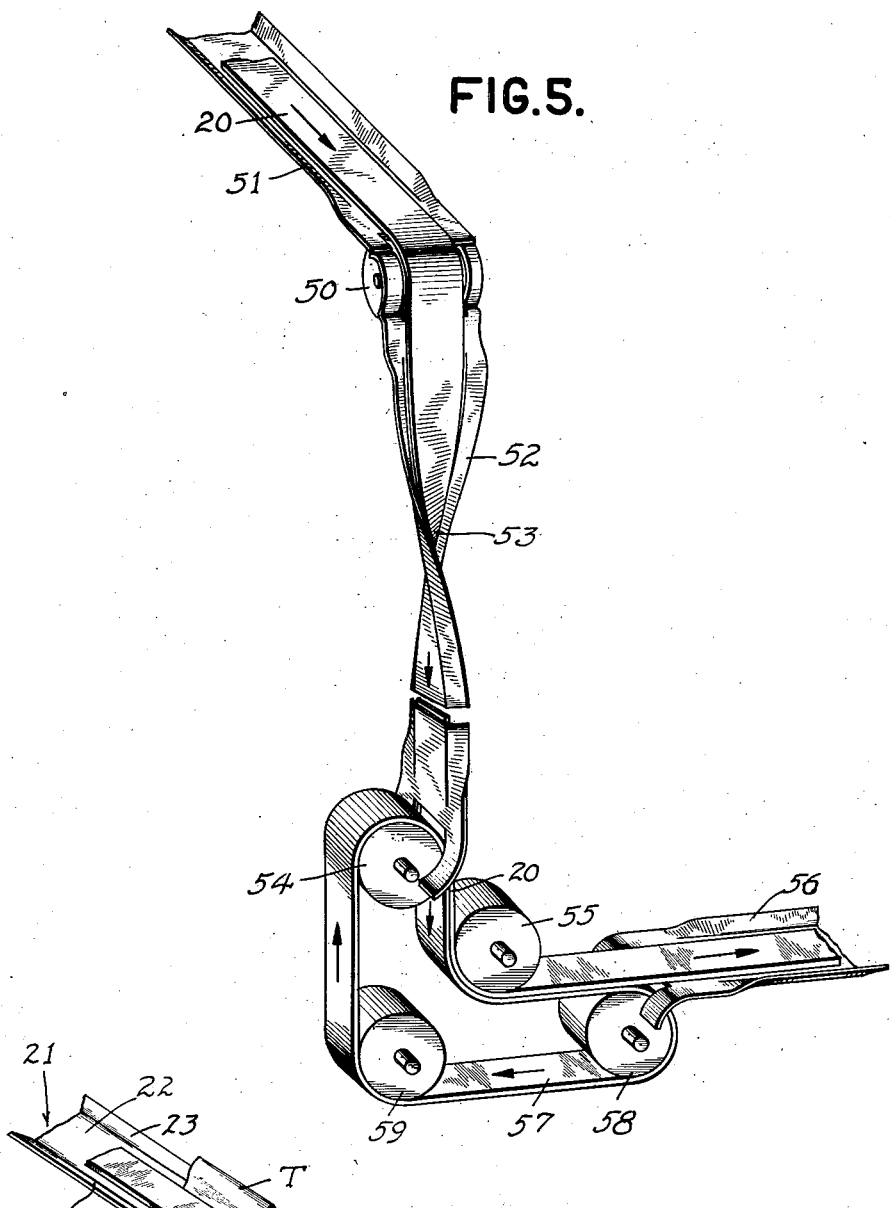
Figure 5 is a perspective view of a twist occurring in a vertical run of the conveyer.

In Figure 5 I have shown a twist occurring in a vertical portion of the conveyer. Referring to this figure it will be seen that the belt 20 approaches the upper roller 50 in a horizontally disposed channel or trough 51 which joins the trough 52 extending vertically downward from the roller 50.

The trough 52 is twisted intermediate its upper and lower ends, as indicated at 53, and terminates adjacent a roller 54, the belt continuing downwardly around a roller 55 and thence horizontally in another trough section 56. An auxiliary endless belt 57, disposed about the rollers 54, 55, 58 and 59, cooperates with the belt 20 to transfer the articles from the outlet of the trough section 52 to the inlet of the trough section 56.

It is obvious that the twists occurring in the conveyer may be either greater or less than 90 degrees and may occur in any desired vertical, horizontal, or inclined part of the conveyer, thus enabling the conveyer to extend to any part of the office or building, and therefore, I do not desire to be limited to the exact arrangements shown and described, except in accordance with the appended claims.

What I claim is:

1. A drag conveyer comprising a stationary channel having a base and outwardly extending side flanges, said channel being twisted intermediate its length so that transverse elements of said base, at spaced points along the length thereof, are inclined to each other, and a belt of less width than the width of the channel positioned in said channel and adapted to travel therein, said belt conforming to the shape of the base of said channel and being in frictional contact therewith, so as to convey sheet material along the channel beneath the belt.

2. A drag conveyer for sheet material comprising a trough having a base and outwardly extending sides, a belt having a width less than the width of the trough, positioned in the trough and adapted to travel therein in frictional contact therewith, whereby sheet material may be conveyed along said trough beneath said belt, said trough being twisted intermediate its ends, and rollers for said belt at each end of said trough, said rollers having their axes disposed at an angle to each other.

3. A drag conveyer for sheet material comprising a stationary support having a base and outwardly extending side walls, a belt adapted to travel in frictional contact with said trough, whereby sheet material may be conveyed along said trough beneath said belt, rollers at each end of said trough for said belt, said rollers having their axes arranged at an angle to each other, and said support and belt being twisted intermediate said rollers to correspond to the angular displacement of said axes.

4. A conveyer system for sheet material comprising a plurality of trough sections disposed end to end and at an angle to each other, rollers positioned at the junction of said trough sections, certain of said rollers having their axes disposed at an angle to others thereof, an endless belt passing over said rollers and adapted to travel in said troughs, said troughs and belt being twisted intermediate the rollers having angularly disposed axes, to correspond to the angular displacement of said axes.

5. A drag conveyer for sheet material comprising a plurality of trough sections, each section having a base and outwardly extending sides, a roller intermediate adjacent trough section, an endless belt passing around said rollers and positioned in said troughs to travel therein for conveying sheet material along said troughs beneath said belt, certain of said trough sections being disposed at an angle to others thereof, whereby said conveyer extends into three dimensional space.

In testimony whereof I affix my signature.

FRANCIS GRIFFITH.